(12) United States Patent
Fullana Font

(10) Patent No.: US 12,330,342 B2
(45) Date of Patent: Jun. 17, 2025

(54) METHOD FOR REMOVING ADHESIVES AND/OR INTERLAMINAR INKS ON LAMINATED PLASTIC MATERIAL

(71) Applicant: Universidad de Alicante, San Vicente del Raspeig (ES)

(72) Inventor: Andrés Fullana Font, San Vicente del Raspeig (ES)

(73) Assignee: Universidad de Alicante, Alicante (ES)

( * ) Notice: Subject to any disclaimer, the term of this patent is extended or adjusted under 35 U.S.C. 154(b) by 548 days.

(21) Appl. No.: 17/755,060

(22) PCT Filed: Oct. 27, 2020

(86) PCT No.: PCT/ES2020/070655
§ 371 (c)(1),
(2) Date: Apr. 20, 2022

(87) PCT Pub. No.: WO2021/089895
PCT Pub. Date: May 14, 2021

(65) Prior Publication Data
US 2022/0362969 A1    Nov. 17, 2022

(30) Foreign Application Priority Data
Nov. 7, 2019    (ES) .................. ES201930975

(51) Int. Cl.
*B29B 17/02*    (2006.01)
*B08B 3/08*    (2006.01)
(Continued)

(52) U.S. Cl.
CPC ............... *B29B 17/02* (2013.01); *B08B 3/08* (2013.01); *B08B 3/10* (2013.01); *B26F 1/24* (2013.01);
(Continued)

(58) Field of Classification Search
None
See application file for complete search history.

(56) References Cited

U.S. PATENT DOCUMENTS 3,054,148 A    9/1962    William
3,546,742 A    12/1970    Emanuel
(Continued)

FOREIGN PATENT DOCUMENTS

| EP | 2832459 A1 | 2/2015 | |
|---|---|---|---|
| JP | 07148737 A * | 6/1995 | ............. B29B 17/02 |
| KR | 200387486 Y1 * | 6/2005 | ................. B26F 1/08 |

OTHER PUBLICATIONS

JP-07148737 English translation, accessed on Oct. 2024. (Year: 1995).*
(Continued)

*Primary Examiner* — Eric W Golightly
*Assistant Examiner* — Arlyn I Rivera-Cordero
(74) *Attorney, Agent, or Firm* — ArentFox Schiff LLP

(57) ABSTRACT

The present invention relates to a method for removing interlaminar adhesives and/or inks on laminated plastic material, which comprises the following steps:
a) microperforating the laminated plastic material with at least one microperforation per $cm^2$,
b) removing the ink and/or adhesive by adding a washing solution to the microperforated plastic resulting from step a),
c) separating the plastic material and the aqueous material.

15 Claims, 2 Drawing Sheets

(51) Int. Cl.
  *B08B 3/10* (2006.01)
  *B26F 1/24* (2006.01)
(52) U.S. Cl.
  CPC . *B29B 2017/022* (2013.01); *B29B 2017/0231* (2013.01); *B29B 2017/0289* (2013.01)

(56) References Cited

U.S. PATENT DOCUMENTS

| | | | | |
|---|---|---|---|---|
| 4,535,020 | A | | 8/1985 | Thomas et al. |
| 6,165,304 | A | * | 12/2000 | Otruba ................... B32B 27/00 |
| | | | | 156/719 |
| 2011/0245457 | A1 | * | 10/2011 | Rougelot ................ C08J 11/06 |
| | | | | 210/184 |
| 2012/0217326 | A1 | * | 8/2012 | Grimes ................... B29B 17/02 |
| | | | | 241/23 |

OTHER PUBLICATIONS

KR-200387486 English translation, accessed on Oct. 2024. (Year: 2005).*
International Search Report mailed Dec. 22, 2020 issued in corresponding PCT Application No. PCT/ES2020/070655, 8 pages.

* cited by examiner

METHOD FOR REMOVING ADHESIVES AND/OR INTERLAMINAR INKS ON LAMINATED PLASTIC MATERIAL

CROSS-REFERENCE TO RELATED APPLICATIONS

This application is a 35 U.S.C. § 371 National Phase of PCT Application No. PCT/ES2020/070655, filed Oct. 27, 2020, which claims priority to Spanish Application No. P201930975, filed Nov. 7, 2019, the disclosures of each of which are incorporated herein by reference in their entirety.

FIELD OF THE INVENTION

The present invention falls within the general field of chemical engineering and environmental chemistry and, in particular, it relates to a method for removing inks and adhesives present on laminated materials.

PRIOR STATE OF THE ART

Plastic is one of the main materials used in the packaging of all types of products. In many cases, a single type of plastic alone is not able to attain the characteristics demanded by the industry. In these cases, it is necessary to use a combination of plastics bonded together to form a multilayer composite material that is called laminate in the industry. Thus, for example, polyethylene is a good barrier to water, but it permeates oxygen, whereas Polystyrene Terephthalate (PET) is a good barrier to oxygen, although it permeates water; if the two materials are combined, a composite plastic can be obtained that protects against oxygen and water.

Another use of laminates is as a barrier for printing pigments. When working with food it is important to ensure that the ink does not come into contact with the food. Therefore, one of the plastic sheets is printed on and then another layer of the same plastic is added so that the ink remains in the interlaminar area, thus protecting the food from coming in contact with the ink.

These laminated materials, despite having many advantages, are a big problem when it comes to being recycled. The difference in melting points between the polymeric materials that the laminates are made of prevents them from being reprocessed by extrusion. Therefore, prior to this step, the sheets must be detached (delaminated) and subsequently the different polymers must be separated prior to recycling.

There are different methods to produce the detachment of the different sheets of this type of material; thus, for example, patent ES2535515T3 describes a method of delamination by means of mechanical/thermal separation, wherein the multilaminated plastic material is immersed in a solvent for a long period so that it passes to the interlaminar area by diffusion when the solvent reaches this area and the laminate is quickly heated so that when the absorbed solvent evaporates, a great thrust force is generated that causes the sheets to detach.

Patent U.S. Pat. No. 4,199,109 describes a process wherein the laminated material is heated to a temperature close to the softening of one of the component polymers of the laminate. Once the plastic is heated, this is thrown onto rollers that exert a high shear force that causes the sheets to detach.

U.S. Pat. No. 5,183,212 describes a process wherein the laminate is ground to a size of less than 1 cm and heated to the melting temperature of one of the plastics that make up the laminate. Next, a large shear force is applied with stirring, causing the sheets to detach.

Patent application EP1683829 describes a process for removing aluminium present in a layer of a laminated material by using bases or alkalis. The dissolution of the aluminium layer leaves the plastic layer free for recycling. To ensure the access of reagent to the aluminium layer, the laminate is ground to powder size.

U.S. Pat. No. 5,278,282 describes the use of tetrahydrofuran (THF) to dissolve one of the sheets of the laminated material that can be styrene or PVC; in this way, one of the components is separated from the other components. The dissolved plastic can be subsequently recovered by evaporating the solvent.

Patent ES2427019 describes a method for removing ink that is printed on plastic film; however, this method is not valid for laminated materials, since it is the plastic itself which prevents the access of the reagents to the interlaminar area where the adhesive is located, and the diffusion of the surfactants through the polymer is too slow for the process to take place.

There is, therefore, the need to provide a method for removing inks and adhesives on laminated materials, which is efficient, so that it enables the plastic materials, as well as the rest of the materials that are part of the product and of the method, such as plastics, water, paints, to be recycled.

BRIEF DESCRIPTION OF THE INVENTION

The present invention solves the problems described in the state of the art since it provides a method for removing the adhesive that keeps sheets of plastic material together, and the subsequent removal of ink.

Thus, in a first aspect, the present invention relates to a method for removing interlaminar adhesives and/or inks on laminated plastic materials (hereinafter, the method of the present invention), which comprises the following steps:

a) microperforating the laminated plastic material, preferably with at least 1-100 microperforations per $cm^2$.

b) removing the ink and/or adhesive by adding a washing solution to the microperforated plastic resulting from step a), c) separating the plastic material and the aqueous material.

In a preferred embodiment, the microperforation of the laminated plastic material is carried out by means of microneedles, abrasive substances or laser. More preferably, the microperforation of the laminated plastic material is carried out by means of microneedles in a microperforation device comprising at least one pair of double rollers configured so that both rotate in the opposite direction and are arranged in the lower portion of a hopper, such that the ground laminated plastic material coming from the mill falls into the hopper and due to the effect of its weight is forced to pass between the rollers. The rollers have microneedles of a length greater than the total thickness of the laminate and regularly distributed between 1 and 100 per $cm^2$. As the laminated plastic material passes between the rollers, the microneedles cause perforations in the material that enable access of the reagent to the interlaminar area.

Preferably, the method of the present invention comprises a step prior to step a), consisting of the conditioning and grinding of the laminated plastic material to be treated, wherein the laminated plastic material is ground into particles of a size preferably between 5-20 centimetres.

In a preferred embodiment, the washing solution of step b) is selected from a solvent solution, alkaline aqueous solution with at least one surfactant, acid solutions and/or mixtures thereof. Preferably, the washing solution is an alkaline aqueous solution with at least one cationic surfactant. Preferably, ammonia and acetic acid are also added.

Preferably, step b) of removing ink and/or adhesive is carried out in a pressure reactor, under stirring and at a maximum temperature of 150° C.

In a preferred embodiment, step c) of separating the plastic material and aqueous material is carried out by means of a centrifuge, preferably for 3-10 seconds at 1000-3000 rpm.

In a preferred embodiment, the method of the present invention comprises an additional step after step c) consisting of treating the aqueous material, for separating the ink and/or adhesives from water. Preferably, the step of treating the aqueous material is carried out by means of a clarifying centrifuge.

In a preferred embodiment, the method of the present invention comprises an additional step after step c) consisting of separating the plastic materials. Preferably, the step of separating the plastic materials is carried out by means of decanting in the wet phase or by using hydrocyclones.

DETAILED DESCRIPTION OF THE INVENTION

Figure 1:
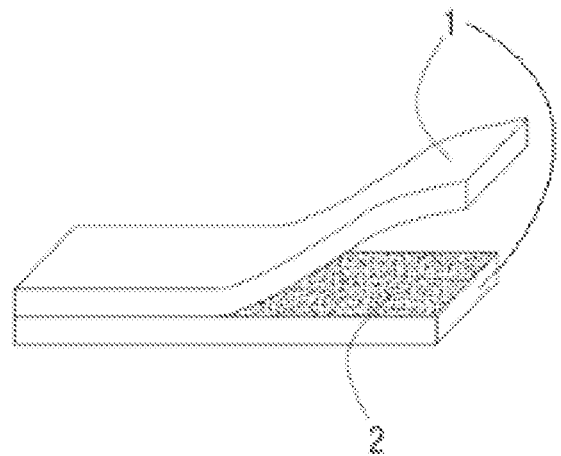
FIG. 1 shows the general diagram of a laminated plastic material.
Figure 2:
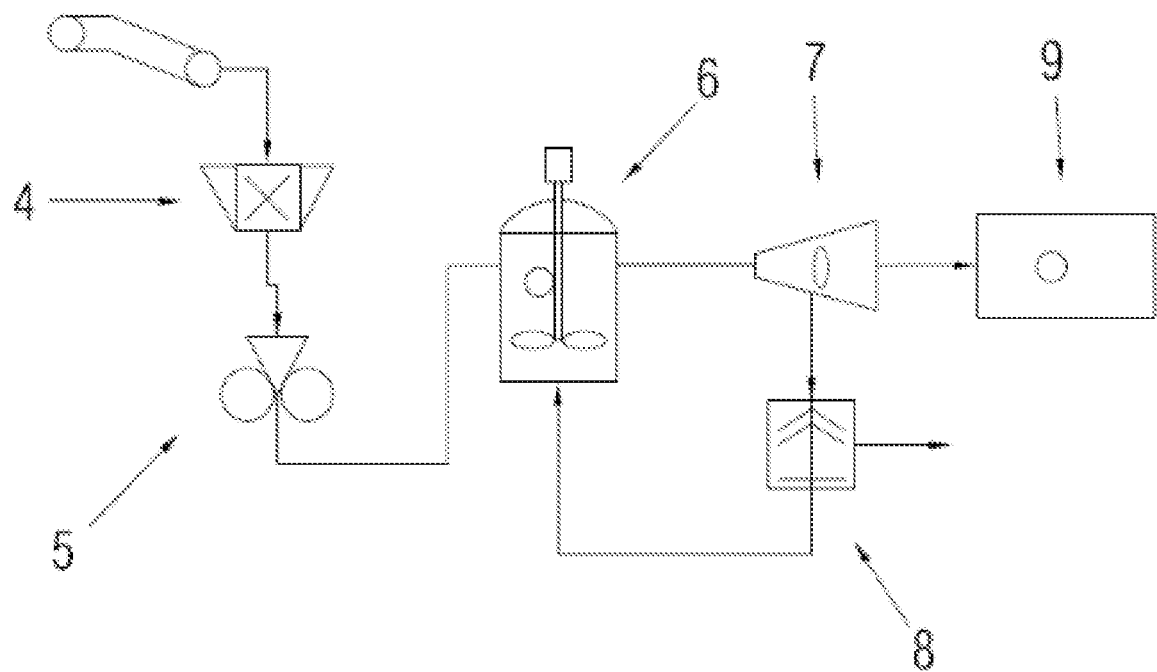
FIG. 2 shows the general diagram of a preferred embodiment of the present invention.

As shown in FIG. 1, a laminated plastic material comprises at least two layers of plastic material (1), and an interlaminar area (2) inserted between the two layers of plastic material (1).

The laminated plastic material can come in different forms: leftover rolls from the packaging industry or finished containers with defects or from the landfill. All this material is selected, large impurities are removed and they are placed on a conveyor belt. To improve the method of the present invention, the laminated plastic material undergoes an optional grinding step; to that end, the material is ground in a specific mill (4) for plastic film until obtaining particles of size comprised between 5 and 20 cm.

Once ground, this material is subjected to microperforation and the access of the reagents to the interlaminar area (2), where the ink and adhesive to be removed are located, is thus facilitated. There are various techniques for performing microperforations, as can be the case of using microneedles, abrasives or laser. Using the microneedle technique is preferably recommended.

Figure 3:
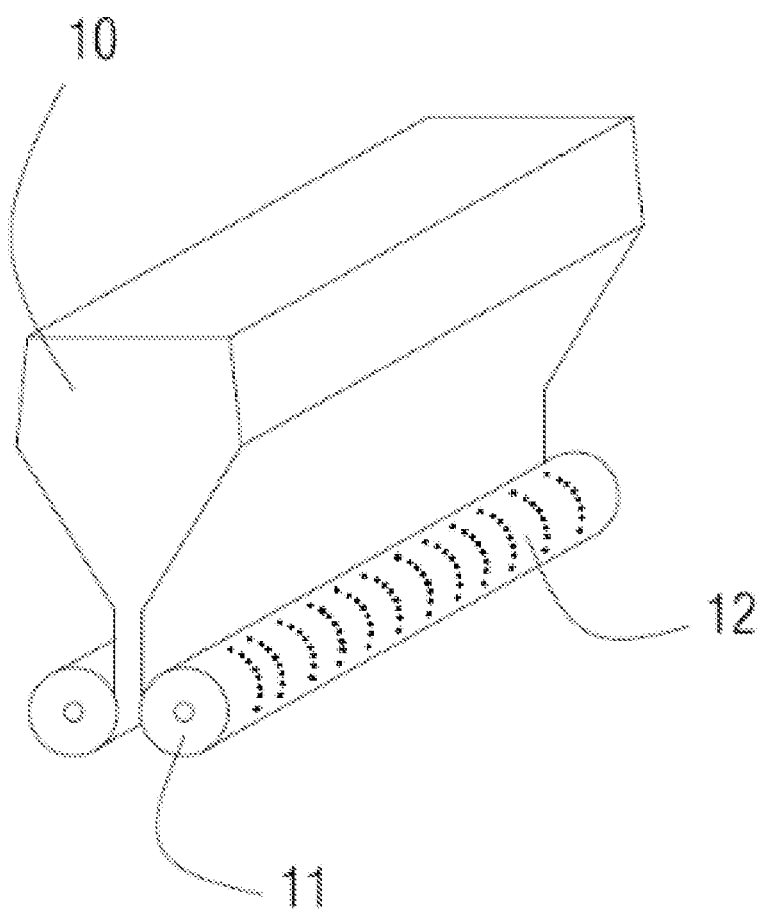
FIG. 3 shows the microperforation device.

In the present invention, the microperforation step was carried out in a microperforation device (5), as shown in FIG. 3.

This device comprises a pair of double rollers (11) configured so that both rotate in the opposite direction and are arranged in the lower portion of a hopper (10), such that the ground laminated plastic material coming from the mill (4) falls into the hopper (10) and due to the effect of its weight is forced to pass between the rollers (11). The rollers (11) have microneedles (12) of a length greater than the total thickness of the laminate and regularly distributed between 1 and 100 per $cm^2$. As the laminated plastic material passes between the rollers (11), the microneedles (12) cause perforations in the material that will enable the access of the reagent to the interlaminar area (2).

The already microperforated laminated plastic material is introduced into a stirring reactor (6), which comprises the washing solution, such that the chemical agents contained in the washing solution can access the interlaminar area (2) of the laminated plastic material and remove the ink and the adhesive.

Any solvent can be used as a washing solution; in the present invention, an alkaline aqueous solution with surfactant agents was preferably used. The surfactants can be cationic, ammonium or non-ionic surfactants; cationic surfactants were used in the present invention. In a preferred embodiment, ammonia and/or acetic acid was added to the washing solution, verifying that these two compounds, although not required, improve the efficiency of the process.

The conditions of the washing step depend on the adhesive that the laminar plastic material comprises, such that this step can be performed at room temperature, when the adhesive is weak, or in the case of stronger adhesives, a temperature increase in the reactor is required; however, in the case of working at temperatures higher than the boiling temperature of the reagent, using an autoclave reactor that works under pressure to avoid the evaporation of the reagent would be required. In any case, the temperature cannot exceed 150° C.

After the washing step, the plastic material together with the washing solution was introduced into a centrifuge (7) to separate the plastic material from the aqueous solution, which contains the water along with the remains of ink and adhesive. To separate both phases, as is known to a person skilled in the art, there are different techniques; however, in the present invention, the material resulting from the washing step was subjected to centrifugation such that, in addition to separating both phases, with the high shear forces produced, the separation of the sheets was favoured and with it the removal of adhesive.

In this manner, on the one hand, the delaminated plastic material without ink or adhesive is achieved, and, on the other hand, the water with the remains of the washing solution together with the ink and the adhesive is achieved.

Optionally, the method may comprise steps to complete the recycling of all materials; to that end, a step of water treatment was performed in a clarifying centrifuge (8) that separated the adhesive particles in the form of sludge and recycled the water to the main reactor. Therefore, in addition to recovering the water, the reagents are recovered, reducing operating costs. To help clean the water, flocculating and/or coagulating agents were added prior to centrifugation.

Furthermore, the delaminated plastic material was recycled. In the event that the initial laminated plastic material is formed by sheets of plastic material of different nature, for recycling to be optimal it must be subjected to separation prior to processing; this separation can be performed by means of decanting in the wet phase based on the difference in density between the different plastics, or by using hydrocyclones. In this case, being a laminated plastic material made up of PET and HPDE, a decanter (9) with water was used, such that the PET remained at the bottom while the HDPE floated, thus separating these two plastics.

The invention claimed is:
1. A method for removing interlaminar adhesives and/or inks on laminated plastic material, comprising the steps of:
   a) microperforating the laminated plastic material with at least one microperforation per $cm^2$, b) removing the ink and/or adhesive by adding a washing solution to the microperforated plastic resulting from step a), and c) separating the laminated plastic material and the washing solution; and a step of conditioning and grinding the laminated plastic material to be treated prior to step a).

2. The method according to claim 1, wherein the microperforation is carried out by means of microneedles, abrasive substances or laser.

3. The method according to claim 1, wherein between 1-100 microperforations per $cm^2$ are performed in step a).

4. The method according to claim 1, wherein the washing solution of step b) is selected from solvent solution, alkaline aqueous solution with at least one surfactant, acid solutions and/or mixtures thereof.

5. The method according to claim 1, wherein ammonia and/or acetic acid is added to the washing solution.

6. The method according to claim 1, wherein step b) of removing ink and/or adhesive is carried out in a pressure reactor, under stirring and at a maximum temperature of 150° C.

7. The method according to claim 1, wherein step b) of removing ink and/or adhesive is carried out in a pressure autoclave at a maximum temperature of 150° C.

8. The method according to claim 1, wherein step c) of separating the laminated plastic material and washing solution is carried out by means of a centrifuge, for 3-10 seconds at 1000-3000 rpm.

9. The method according to claim 1, comprising an additional step after step c) consisting of treating the washing solution, for separating the ink and/or adhesives from the washing solution.

10. The method according to claim 9, wherein the step of treating the washing solution is carried out by means of a clarifying centrifuge.

11. The method according to claim 1, comprising an additional step after step c) consisting of separating the laminated plastic material.

12. The method according to claim 11, wherein the step of separating the laminated plastic material is carried out by means of decanting in the solution phase or by using hydrocyclones.

13. A microperforation device for laminated plastic material, comprising:

a mill for grinding the laminated plastic material, a hopper for receiving the laminated plastic material from above, a pair of double rollers, rotating in opposite directions and arranged in the lower portion of the hopper, for receiving the laminated plastic material from the hopper due to the effect of gravity, and microneedles located on the rollers to perforate the laminated plastic material as it passes between the rollers, wherein the microperforation device is used to remove interlaminar adhesives and/or inks on laminated plastic material, comprising the steps of:

a) microperforating the laminated plastic material with at least one microperforation per $cm^2$, b) removing the ink and/or adhesive by adding a washing solution to the microperforated plastic resulting from step a), and c) separating the laminated plastic material and the washing solution; and a step of conditioning and grinding the laminated plastic material to be treated prior to step a).

14. The microperforation device for laminated plastic material according to claim 13, wherein the microneedles have a length greater than the thickness of the laminated plastic material.

15. The microperforation device for laminated plastic material according to claim 13, wherein the mill is used to grind the laminated plastic material until obtaining particles of size comprised between 5 and 20 cm.

* * * * *